June 18, 1963 H. H. STEWART ET AL 3,094,206

CONVEYOR SYSTEMS

Filed Oct. 28, 1958 12 Sheets-Sheet 1

INVENTORS
Harold H. Stewart
Herman S. Johns

BY Esthastings Ackley

ATTORNEY

INVENTORS
Harold H. Stewart
Herman S. Johns
BY E. Hastings Ackley
ATTORNEY

CONVEYOR SYSTEMS

INVENTORS
Harold H. Stewart
Herman S. Johns
BY
Ee Hastings Ackley
ATTORNEY

June 18, 1963 H. H. STEWART ET AL 3,094,206

CONVEYOR SYSTEMS

Filed Oct. 28, 1958 12 Sheets-Sheet 4

INVENTORS
Harold H. Stewart
Herman S. Johns
BY E. Hastings Ackley
ATTORNEY

INVENTORS
Harold H. Stewart
Herman S. Johns
BY
Esbastings Achley
ATTORNEY

INVENTORS
Harold H. Stewart
Herman S. Johns
BY E. Hastings Ashley
ATTORNEY

INVENTORS
Harold H. Stewart
Herman S. Johns
BY Ed Hastings Ackley
ATTORNEY

INVENTORS
Harold H. Stewart
Herman S. Johns
BY E. Hastings Ackley
ATTORNEY

INVENTORS
Harold H. Stewart
Herman S. Johns

BY Hastings Ashley
ATTORNEY

June 18, 1963 H. H. STEWART ET AL 3,094,206
CONVEYOR SYSTEMS
Filed Oct. 28, 1958 12 Sheets-Sheet 10

INVENTORS
Harold H. Stewart
Herman S. Johns
BY
Hastings Ashley
ATTORNEY

CONVEYOR SYSTEMS

Filed Oct. 28, 1958 12 Sheets-Sheet 11

INVENTORS
Harold H. Stewart
Herman S. Johns

BY

ATTORNEY

CONVEYOR SYSTEMS

Filed Oct. 28, 1958 12 Sheets-Sheet 12

INVENTORS
Harold H. Stewart
Herman S. Johns

BY Hastings Ackley
ATTORNEY

United States Patent Office 3,094,206

Patented June 18, 1963

3,094,206

CONVEYOR SYSTEMS

Harold H. Stewart and Herman S. Johns, Dallas, Tex., assignors to Stewart Engineering & Equipment Company, Inc., Dallas, Tex., a corporation of Texas Filed Oct. 28, 1958, Ser. No. 770,117

23 Claims. (Cl. 198—189)

This invention relates to conveyor systems and more particularly to conveyor systems having a conveyor provided with a plurality of spaced members which provide a support means upon which objects to be transported by the system may rest.

An object of this invention is to provide a new and improved conveyor system.

Another object of the invention is to provide a new and improved conveyor having support means which are adapted to support objects thereon while contacting only small portions of the surface of such objects.

Still another object is to provide a conveyor having a plurality of resilient support members which are connected to a flexible draw member and extend laterally outwardly therefrom.

A further object of the invention is to provide a conveyor wherein the support members are resilient and permit movement of the draw member in curved paths.

A still further object is to provide a conveyor system comprising a central flexible draw member having a plurality of support members extending laterally therefrom and having rest means upon which the support members abut at points spaced laterally outwardly of the draw member.

A still further object is to provide a conveyor wherein the rest members are in the form of vertical rest bars upon which the support members slide.

Still another object is to provide a conveyor wherein the rest bars are disposed angularly with respect to the flexible draw member whereby the wear on the rest bars due to the sliding contact with the side bars is diminished by being distributed over larger areas of the support members.

Still another object is to provide a conveyor having a flexible central draw member formed of a plurality of articularly joined links and a plurality of substantially V-shaped resilient support members extending laterally outwardly on both sides from the links to constitute support means upon which objects may rest and be carried by the conveyor.

A further object is to provide a conveyor wherein the support members are comprised of V-shaped horizontal members having angularly extending fastening leg portions at the free ends thereof which are receivable in vertical apertures provided in the links of the draw member whereby the support members may be removably secured to the draw member.

A still further object of the invention is to provide a conveyor wherein the dependent legs of each support member are connected to adjacent links of the draw member whereby the resilience of the draw members serves to absorb any shocks imparted to the draw member and to steady the movement of the links of the draw member relative to one anoher.

Still another object of the invention is to provide a conveyor system having guide means engageable by the draw member to effect change of the direction of movement of the draw member.

Still further object of the invention is to provide a conveyor having an articulated draw member capable of movement in curvilinear paths in more than one plane.

Additional objects and advantages of the invention will be readily apparent from the reading of the following description of a device constructed in accordance with the invention, and reference to the accompanying drawings thereof, wherein.

Figure 1:
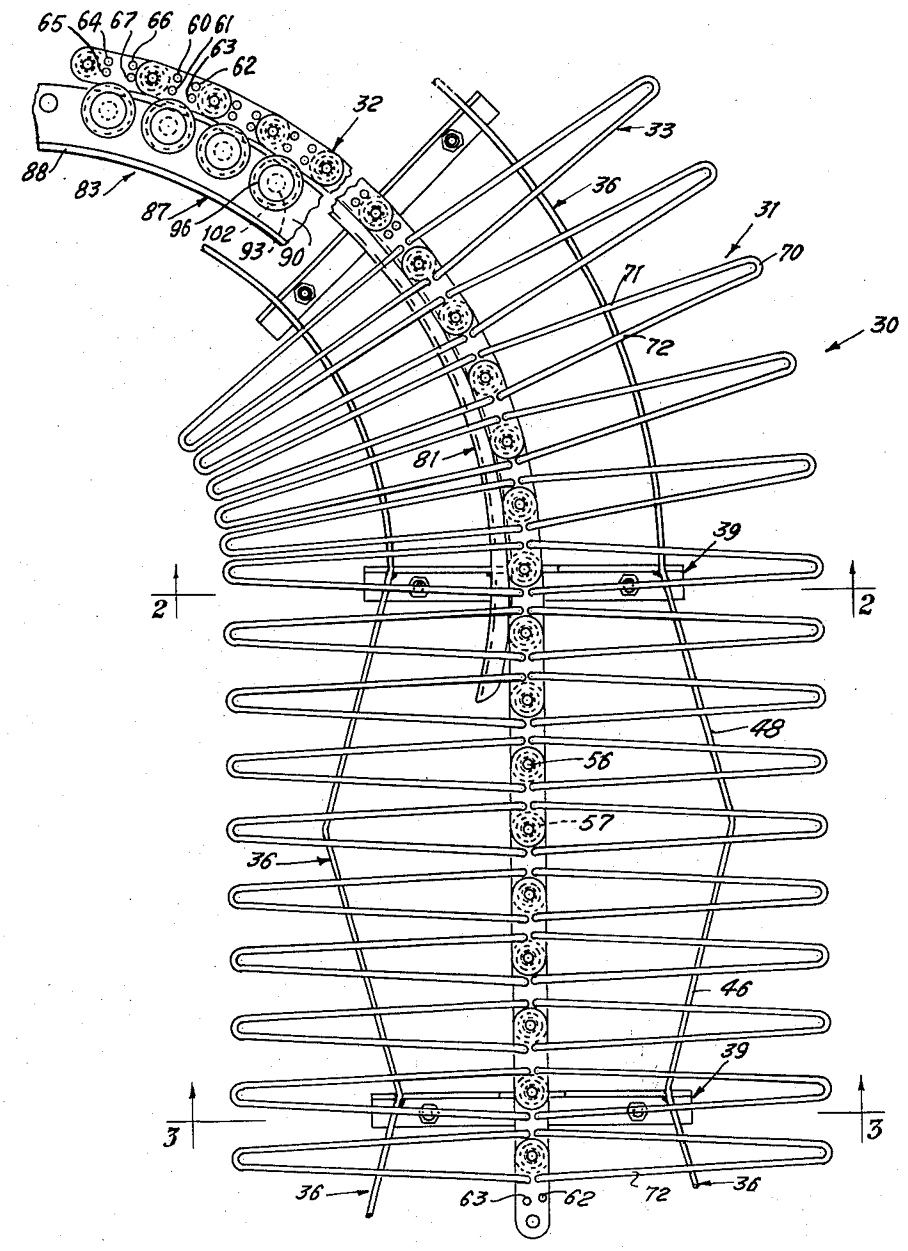
FIGURE 1 is a fragmentary plan view of one form of the conveyor system of the invention.
Figure 2:
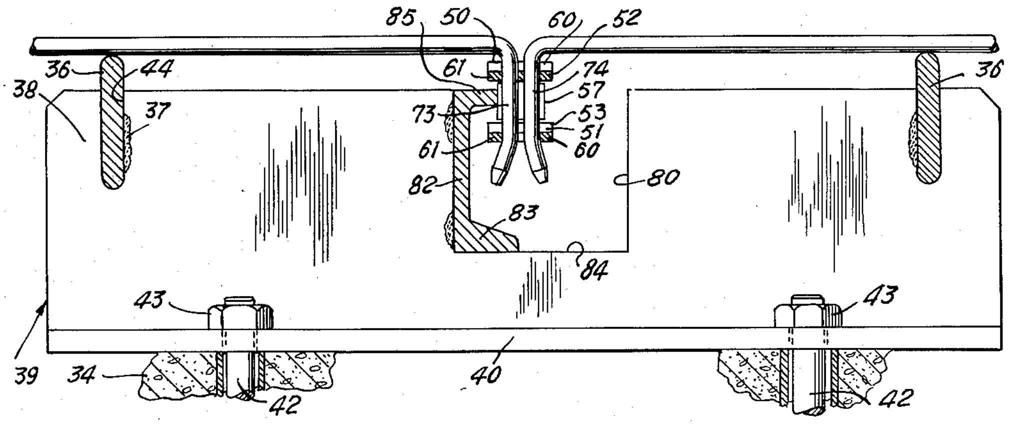
FIGURE 2 is a sectional view taken on line 2—2 of FIGURE 1.
Figure 3:
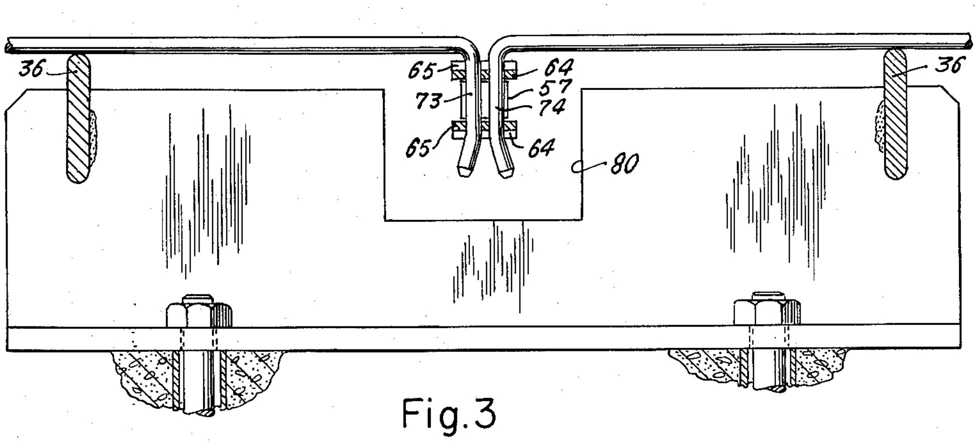
FIGURE 3 is a sectional view taken on line 3—3 of FIGURE 1.

Referring now particularly to FIGURES 1, 2 and 3 of the drawings, the conveyor system 30 there illustrated includes a conveyor 31 comprised of a central flexible or articulated draw member 32 from which the support members 33 extend laterally horizontally. The conveyor is supported on a fixed structure, such as a concrete slab 34, by means of side bars 36 disposed on opposite sides of the draw member. The side bars are rigidly secured, as by welds 37, to the vertical flanges 38 of the angle mounts 39. The horizontal flanges 40 of the mounts are rigidly secured to the supporting structure 34 by bolts 42 which project through appropriate bores in the horizontal flanges and which are provided with nuts 43 on their threaded upper ends.

The side bars 36 may extend through suitable vertical upwardly opening slots 44 in the vertical flanges 38 of the support mounts and are preferably disposed at an angle to the direction of movement of the conveyor in order to spread the wear on the support members 33 over large areas thereof. For example, each side bar 36 may have two sections 46 and 48 which extend laterally outwardly from adjacent support mounts 39.

The draw member 32 may be in the form of a chain having pairs of upper and lower outer links 50 and 51 which are connected by pairs of upper and lower inner links 52 and 53. The links are connected together by pins 56 which extend through aligned vertical apertures in the outer and inner links and through tubular spacer or roller members 57 which are interposed between the inner links. Each of the upper and lower outer links 50 and 51 are provided with four aligned vertical apertures or bores 60, 61, 62 and 63. The inner upper and lower links 52 and 53 are provided with similar vertical aligned bores 64, 65, 66 and 67.

The support members 33 of the conveyor are preferably formed of a single resilient rod or wire member having an outer central bight portion 70 connecting divergent horizontal legs 71 and 72. The horizontal legs have dependent legs 73 and 74 which are provided with angularly downwardly extending end or retainer portions 75 and 76, respectively. The retaining portions are preferably provided with beveled shoulders 78 whereby their insertion in the bores of the links is facilitated.

Figure 5:
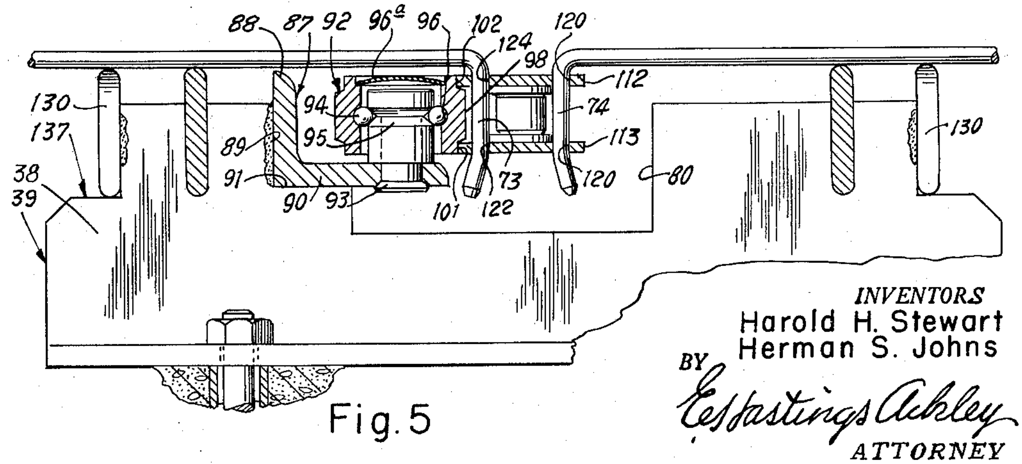
FIGURE 5 is a sectional view taken on line 5—5 of FIGURE 4.

It will be apparent that the dependent legs 74 and 73 of each support member 33 are so connected to the articulated draw member 32 that one of the dependent legs 73 or 74 extends through a pair of vertically aligned bores in the outer links and its other dependent leg extends through a vertically aligned bore in an adjacent pair of inner links. For example, where a support member has its dependent leg 73 extending through the aligned bores 61 of a pair of outer links, its other dependent leg 74 then extends through the aligned bores 67 of an adjacent pair of inner links. The next support member then has its dependent leg extending through the bores 65 of the same pair of inner links and its leg 74 extending through the vertically aligned bores 63 of the next pair of outer links. In this manner each support member is connected to adjacent inner and outer links on opposite sides of the connecting hinge pins 56 and rollers 57. Pivoting of the inner links relative to the outer links is therefore accomplished against the resilient force of the support members 33, the legs 71 and 72 thereof flexing about bight portions 70 to accommodate such pivotal movement of adjacent links. The draw member 32 and the dependent legs of the support members extend at least partially into upwardly opening slots 80 in the vertical flanges 38 of the support mounts.

Where the conveyor 31 begins change of direction, a vertical arcuate channel guide member 81 is disposed in the slots 80 of the mounts 39 having its web 82 abutting and being welded to one vertical side of the flange defining the slot 80 and having its lower flange 83 resting upon the bottom edge 84 defining the bottom of the slot. The upper flange 85 of the arcuate guide member 82 has its edge in position to engage the rollers 57 of the draw member and thus serves to guide the draw member as its moves past the guide member. The guide surface of the flange 85, of course, is always convexly shaped being disposed on the inner side of any curve around which the draw member 32 moves. An angle guide member 87 is provided where the forces exerted by the draw member are greater. The angle member 87 is secured to the vertical flanges 38 of the support mounts by welding. The vertical flange 88 of the angle member 87 abuts a vertical edge 89 of a notch cut in one side of the vertical flange adjacent the slots 80 and its horizontal flange 90 rests upon the upwardly facing edge 91 defining the lower edge of such notch. The horizontal flange is provided with a plurality of spaced rollers 92, like those shown in FIGURE 5, which are mounted for rotation on pins 93 rigidly secured to the horizontal flange 90. The rollers are held in position for rotatable movement about the pins 93 by ball bearings 94 which are positioned in aligned grooves 95 and 16 of the pins and of the roller, respectively. A cover 96A may be carried by the rollers above the pins 95 to protect the roller bearing connection from dirt and foreign matter. The rollers 92 have an annular external flange 98 which extends between the pairs of upper and lower links and which provides vertical shoulders 101 and 102 which are abutted by the side edges of the outer links 51 and 50, respectively. It will be apparent that the rollers 92 provide a greater support and guidance for the draw member 32 than the channel guide member 82 since they abut the draw member at two fairly widely spaced points and are therefore employed where forces exerted by the draw member against the guide member are relatively great.

The draw member is, of course, endless and may be driven by any suitable drive sprocket means powered by any suitable prime mover, such as an electric motor, in a manner which will be described below.

It will now be apparent that a new and improved conveyor system has been illustrated and described which includes a conveyer 31 formed of a flexible or articulated draw member having laterally extending support members secured thereto for movement therewith.

It will further be apparent that the conveyor system includes a plurality of support mounts which carry side bars upon which the support members 33 are slidable and upon which the conveyor is supported.

It will further be apparent that the support members 33 are of relative small diameter wire so that when the conveyor is used as a means for cooling loaves of bread or the like, the cooling of the bread is uniform at all outer surfaces of the bread since the bread is exposed throughout substantially its whole outer surface to the atmosphere, the support members 33 contacting only small portions of such outer surfaces and having a relative low heat storage capacity.

It will further be seen that the draw member is of the chain or articulated type having alternate pairs of inner and outer pairs of links which are pivotally connected together at adjacent overlapped ends and that such pairs of links are provided with vertically aligned bores whereby the dependent legs of the substantially V-shaped support members may be secured to the draw member to extend laterally outwardly therefrom.

It will further be seen that the side or rest bars 36 are spaced laterally from the draw member on either side thereof and that they extend substantially parallel to the path of movement of the drawbar, except that, in order to minimize concentration of wear on the thin support members, certain sections, such as the sections 46 and 48 of the side bars, are disposed angularly with respect to the path of movement of the draw member in order to cause different bottom surfaces of the support members to rest thereupon during the course of movement of the conveyor across the supporting side bars. The angularly disposed side bar sections also minimize or reduce spreading which could result from heat generation between two contact surfaces which are in constant contact.

It will now be seen that the conveyor system illustrated in FIGURES 1, 2 and 3, is of simple, economical design utilizing a simple link draw chain and support members formed of resilient wire.

It will further be seen that the conveyor 31 is light in weight and may be easily lifted from the support mounts for cleaning and repair since it is not in any way fastened or secured to the supporting structure other than as it may be secured thereto by the drive sprockets which are to be described below.

Referring now particularly to FIGURES 4, 5, 6 and 18 of the drawing, the modified form of the conveyor system 110 there illustrated includes a draw member 111 whose outer links 112 and 113 are in the form of flat plates which are of greater width than the inner links 114 and 115. The inner links 114 and 115 are secured rigidly together by means of sleeves 116 about which are disposed rollers 117. The inner and outer links are secured together by pins 118 which extend through the sleeves 116 and through aligned apertures 119 in the upper and lower links 112 and 113, respectively.

The outer plates 112 and 113 are provided with vertically aligned bores or holes 120, 121, 122 and 123, adjacent the corners thereof. The support members 33 have their dependent legs received in and extending through pairs of holes 120 and 121 of adjacent outer plates on one side and pairs of holes 122 and 123 on the other side as is clearly evident in FIGURES 4, 6 and 5. The adjacent end edges of the outer plates are spaced from each other to permit pivotal movement of the outer and inner links about the pins 118.

The conveyor 111 is supported upon relatively straight side bars 130 wherever the path of movement of the conveyor is relatively straight and upon arcuate side bars 132 wherever the path of movement of the conveyor is in a curve. The side bars 130 are rigidly secured, as by welding, to support mounts 39 in the same manner as the side bars 36 of the form of the conveyor illustrated in FIGURES 1, 2 and 3. The side bars 130, however, extend angularly relative to the path of movement of the draw member 111 in order to distribute the wear due to the slidable movement of the support members 33 thereon over greater portions of the under surfaces of the support members 33. In order to provide for overlapping of the end portions of adjacent side bars 130, the vertical flanges 38 of the support mounts 39 are notched at their outer ends as at 137 to receive outermost side bars 130. The side bars 130, of course, are secured to the vertical flange 38 of the support mounts in a suitable manner, as by welding. The previously described arcuate guide 83 is provided at all points of curvature of the path of movement of the conveyor, the shoulders 101 and 102 of the rollers 93 engaging the side edges of outer upper and lower plates 112 and 113 to guide them in their movement about such arcuate path and also to help support the draw member at such points.

It will be apparent that the conveyor system 109 functions in substantially the same manner as the conveyor system 130 described above but the provision of the larger and stronger links 112 and 113 permits the use of support members 33 of greater diameter and greater strength so that heavier objects may be transported by such conveyor.

In FIGURES 7, 8, 9, 10 and 11 is illustrated another form of the conveyor system 150 wherein the conveyor 151 is doubly articulated so that it may change its direction of movement not only laterally but vertically so that it is capable of change of direction of movement in all planes, vertically as well as horizontally. The conveyor 151 includes a draw member 152 having inner link assemblies 153 composed of lateral links 154 and 155 which lie in vertical planes and which are mounted for pivotal movement on pins 156 and are held in spaced relation to each other by spacer sleeves 157 disposed on such pins and between the links. The outer surfaces of the pins are barreled. Rollers 157 are disposed on the spacer sleeves in order that the pins may be moved laterally relative to the links for a purpose to be described. Adjacent pins 156 of adjacent link assemblies 154 have secured thereto on opposite ends thereof carrier brackets 160 which are substantially channel shaped having vertical webs 161 provided with suitable apertures in which the outer ends of the pins 156 are received and upper and lower horizontal flanges 163 and 164. The inner link assemblies, of course, are free to pivot in vertical planes about the barreled pins 156 while the loose fit of the spacer sleeves 157$a$ on the barrel pins permits a limited lateral movement of the carrier brackets relative to the inner link assemblies so that the draw member 152 may travel in arcuate paths in a horizontal path. The pivotal mounting of the inner links 154 and 155 about the horizontal pins 156, of course, permits movement of the draw member 152 in arcuate path in a vertical plane so that the draw member is capable of change of direction in two planes.

The support members 33 have their dependent legs 73 and 74 extending through aligned bores or apertures 165 and 166 in the horizontal flanges 163 and 164 of the carrier brackets. A roller 167 is preferably disposed about some of the dependent legs 74 and between the horizontal flanges. The rollers may be of metal or nylon and be provided with an oilite sleeve bearing 168.

The conveyor 151 is mounted on a support frame 170 which includes side plates 171 and 172 which are held rigid vertically in spaced relationship to one another by lower transverse bars 173 and by upper cross bars 174 which are spaced above the lower cross bars 173. The upper cross bars 174 are provided with a pair of side or rest bars 176 upon which the support members 33 are slidably supported. The side bars 176 are composed of sections 177 and 178 which are angularly disposed relative to one another in order to distribute the wear on the carrier members over a large bottom surface thereof along the straight portions of the path of movement of the draw member and of arcuate sections 179 along the arcuate paths of movement of the draw member 152.

The support frame 170 also includes a vertically disposed channel guide member 178 rigidly secured to the upper cross bars, as by welding, whose upper and lower horizontal flanges 179 and 180 engage the rollers 168 to guide the movement of the draw member 152 along arcuate portions of the path of movement thereof. A guide 183 is similarly secured to the upper cross bars 74 which is identical in all respects with the guide member 87 illustrated in FIGURES 4 and 5 except that it is channel shaped and has spaced horizontal flanges 184 and 185 provided with the rollers 92 to guide the movement of the draw member where the radius of curvature is relatively small. The rollers 92 engage the edges of the horizontal flanges 163 and 164 of the carrier brackets to guide the draw member in its movement around the curved portions of its path of movement.

The side plates 171 and 172 may have journalled therein a sprocket shaft 185$a$ at points in the path of movement of the conveyor where the path of movement is to be changed in a vertical plane.

The sprocket shaft 185a is provided with a sprocket 186 having teeth 187 which are adapted to engage the rollers 157 of the vertical link assemblies 153 and are also provided with discs 188 and 189 which are aligned with the side bars 176 and serve to support and guide the movement of the support members 33. If desired the sprocket shafts 185 could be connected to a prime mover by any suitable transmission means whereby the sprockets 187 would drive the draw member. Disposed beneath the upper cross bars 174 and rigidly secured to the lower cross bars 73 is a vertical support bar 190 whose upper surface engages and supports the rollers 157 of the link assemblies 153. This support bar is necessary since the lower portions of the conveyor which are now traveling in a direction opposite to that of the movement of the upper portions of the conveyor cannot have side bars upon which to rest because of sanitary reasons. The side bars 176 extend below the upper cross arms 174 so that their lower edges 193 prevent undue tilting of the support members 33. It will be noted that the outer load contacting surfaces of the support members 33 never touch any part of the support frame or elements thereof so that these surfaces are always clean. It will, of course, be apparent that the portions of the conveyor which are traveling beneath the upper cross arms 174 support no load, the loads of bread or other material being carried by the conveyor being removed prior to or at the moment of change of direction of movement of the conveyor in a vertical plane.

Figures 17, 18, 19, 20:
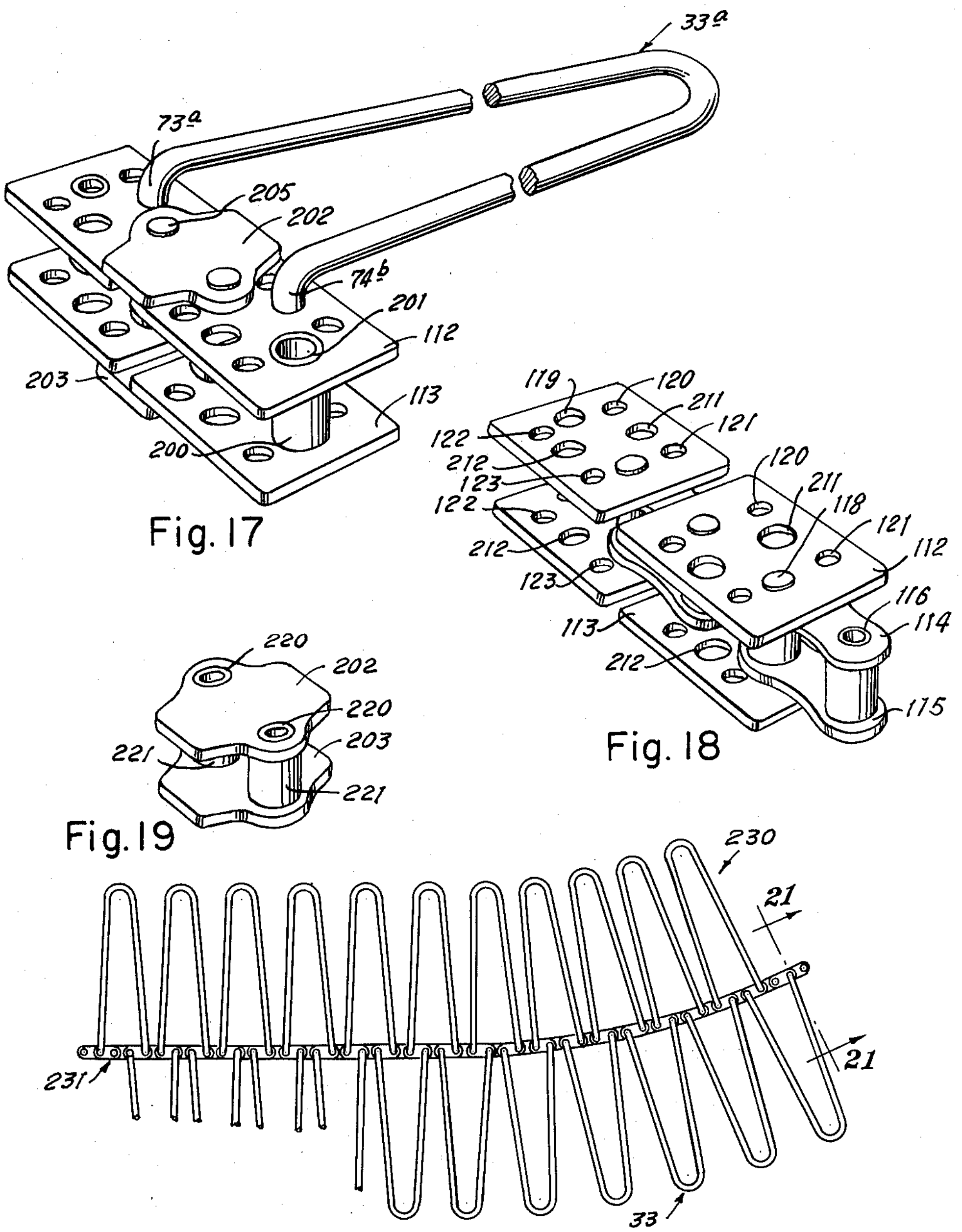
FIGURE 17 is a fragmentary sectional view showing still another modified form of construction of the draw member of the conveyor.
FIGURE 18 is a fragmentary perspective view of still another form of the draw member.
FIGURE 19 is a perspective view of another form of the links usable in a draw member.
FIGURE 20 is a top view of another modified form of the conveyor.

In FIGURE 17 is illustrated another form of the draw member utilizing the plates 112 and 113 wherein the plates 112 and 113 are held in spaced relation by a roller 200 mounted on a spacer sleeve 201 which extends through the rollers 200 and is rigidly secured to the links 112 and 113. Adjacent pairs of links 112 and 113 are secured together by connecting outer links 202 and 203 by means of pins 205 which are rotatably secured to the connecting plates 202 and 203 and extend through the sleeves 201.

The links 112 and 113 are provided with aligned large bores 211 and 212, respectively, which are adapted to receive the dependent legs 73a and 74b of the support member 33a which is formed of heavier wire or rod than the support member 33. It will be apparent that the dependent legs of one support member 33a are received in the aligned vertical bores 211 of adjacent links to project laterally outwardly therefrom on one side and that the aligned bores 212 are adapted to receive the dependent legs of another support member 33a which projects laterally outwardly in the opposite direction.

Figures 11, 12, 13, 14, 15:
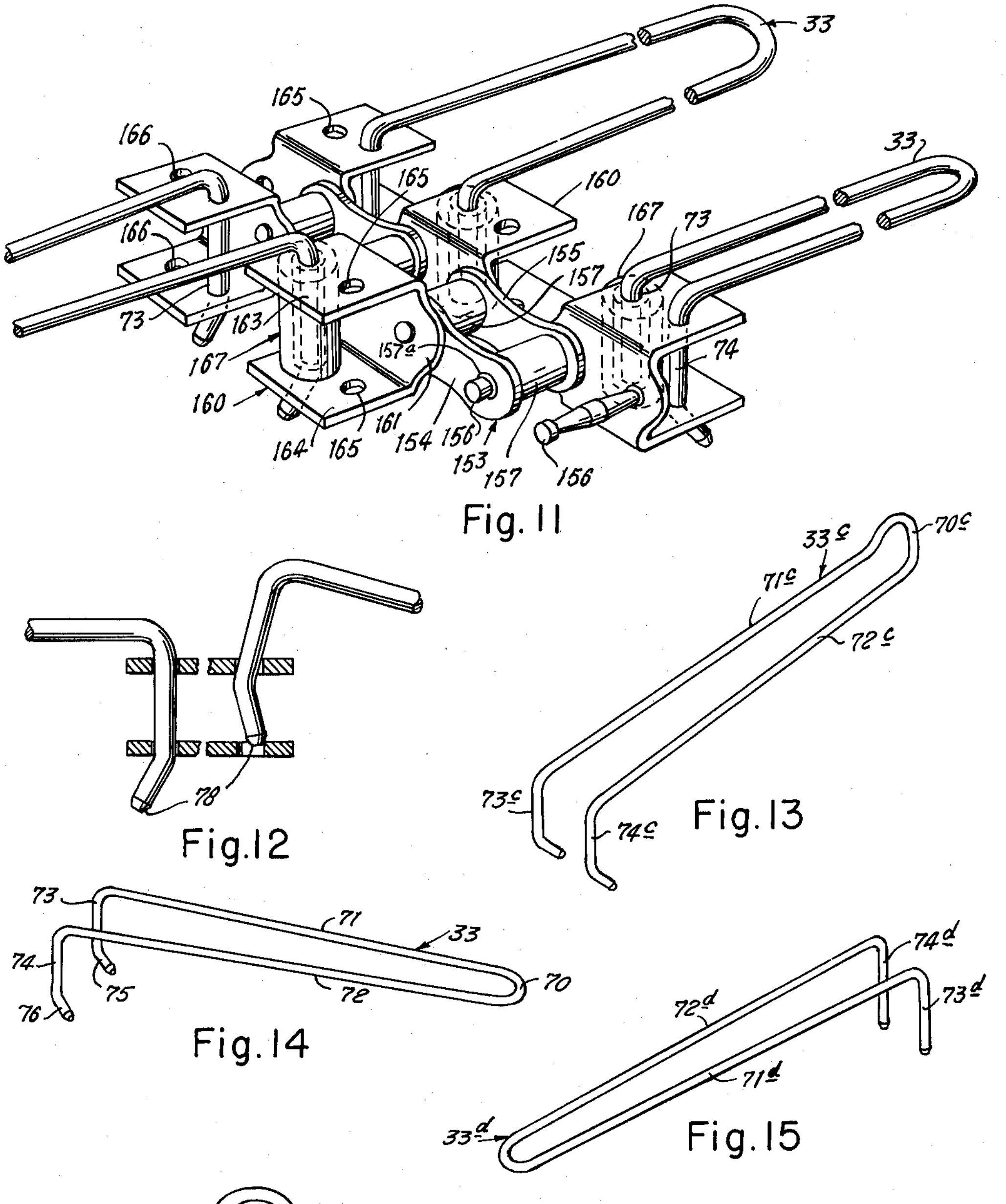
FIGURE 11 is an enlarged fragmentary perspective view showing alternative methods of securing the V-shaped support members to the flexible draw member.
FIGURE 12 is a fragmentary enlarged view showing the method of insertion of the dependent fastening legs of the support members to the links of the draw member.
FIGURE 13 is a perspective view of one form of the support members.
FIGURE 14 is a perspective view of another form of the support members.
FIGURE 15 is a perspective of still another form of the support members.
Figure 16:
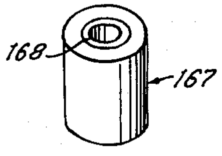
FIGURE 16 is an enlarged perspective view of a roller employed in the support brackets of the draw members of the conveyors shown in FIGURES 7 through 11.

The support members of the various conveyors may also take the form of the support member 33c illustrated in FIGURE 13 which is similar in all respects to the support member 33 except that the bight portion 70c thereof is turned angularly upwardly from the horizontal legs 71c and 72c in opposite direction from the dependent legs 73c and 74c.

The support members may also be in the form illustrated in FIGURE 15 wherein the support member 33d is similar in all respects to the support member 33 except that the dependent legs 74d and 73d which extend angularly downwardly from the horizontal legs 71d and 72d are not provided with retainer portions 75 and 76.

If desired, the links 202 and 203 may be secured together by sleeves 220 and provided with rollers 221. In this case the links 202 and 203 become inner links and are disposed between the links 112 and 113 being secured thereto by the usual pins 205 as illustrated in FIGURE 17. This construction illustrates how the gaps between chain links may be bridged to improve the smooth passage of links along rollers.

Figure 21:
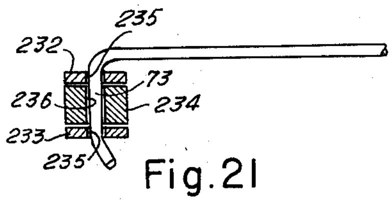
FIGURE 21 is an enlarged sectional view taken on line 21—21 of FIGURE 20.

In FIGURES 20 and 21 is illustrated a conveyor 230 whose draw member 231 is formed of a plurality of pairs of outer links 232 and 233 which are connected together by intermediate links 234. The outer links and the intermediate links are provided with vertically aligned bores 235 and 236, respectively, in which are received the dependent legs 73 and 74 of the support members 33, the dependent legs 73 and 74 serving to connect the outer and inner intermediate links which are thus connected for pivotal movement.

Figure 4:
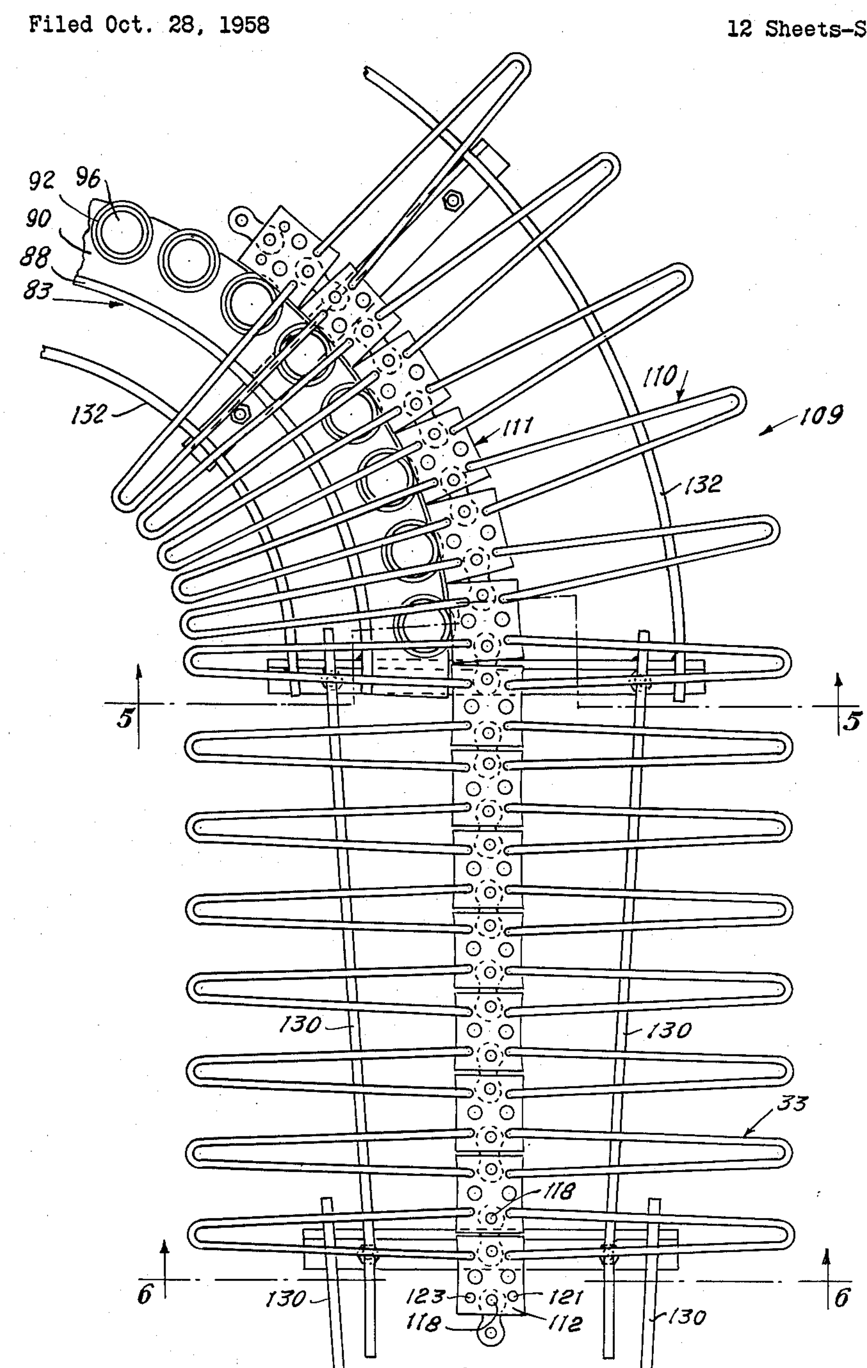
FIGURE 4 is a fragmentary plan view of another form of the conveyor system of the invention.
Figure 6:
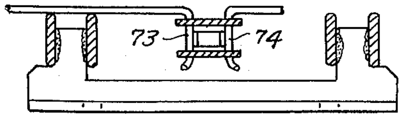
FIGURE 6 is a fragmentary reduced sectional view taken on line 6—6 of FIGURE 4.
Figures 22, 23:
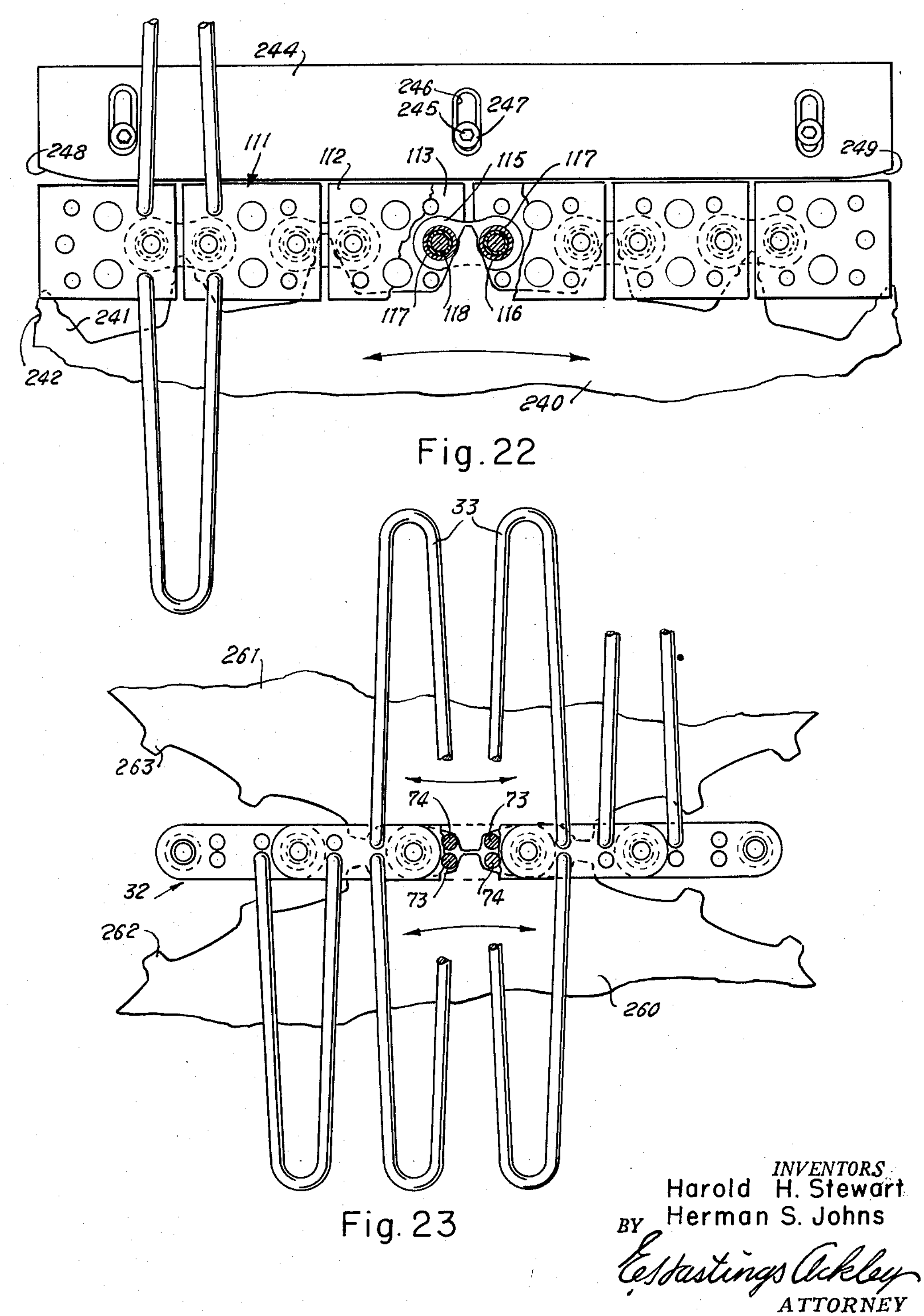
FIGURE 22 is a plan view, with some parts removed and others broken away, of the conveyor illustrated in FIGURE 4 showing one means for driving the draw member.
FIGURE 23 is a plan view with some parts removed and others broken away of another form of drive means for the draw members of the conveyors of the invention.

In FIGURE 22 is illustrated a sprocket gear 240 which is employed to drive the draw members of conveyors, e.g., the draw member 111 illustrated in FIGURE 4. The sprocket 240 is driven by an appropriate drive shaft, now shown, and is provided with teeth 241 which extend between the rollers 117 disposed between the inner links 114 and 115 as the sprocket is rotated to engage the rollers 117 and cause the draw member 111 to move in either one direction or the opposite. The teeth 241 of the sprocket 240 are designed to provide a minimum of friction between the rollers 117 and the engaging surfaces of the teeth 241. As shown, the sprocket teeth 241 are provided with arcuate recesses 242 in which the outer surfaces of the rollers 117 are received as each tooth progressively and sequentially enters between the rollers 117 of succeeding pairs of inner links 114 and 115.

To prevent outward movement of the draw member a backup strip 244, which engages the side edges of the outer links, is secured to a fixed structure by means of bolts 245 which extend through horizontal slots 246 provided in the backup strip. Nuts 247 on the bolts serve to engage and hold the backup strip in any adjusted position. The backup strip may be of nylon or other substance having a low coefficient of friction and have rounded corners or edges which engage the side edges of the outer plates to help guide the draw member between the sprocket and the backup plate.

Figure 7:
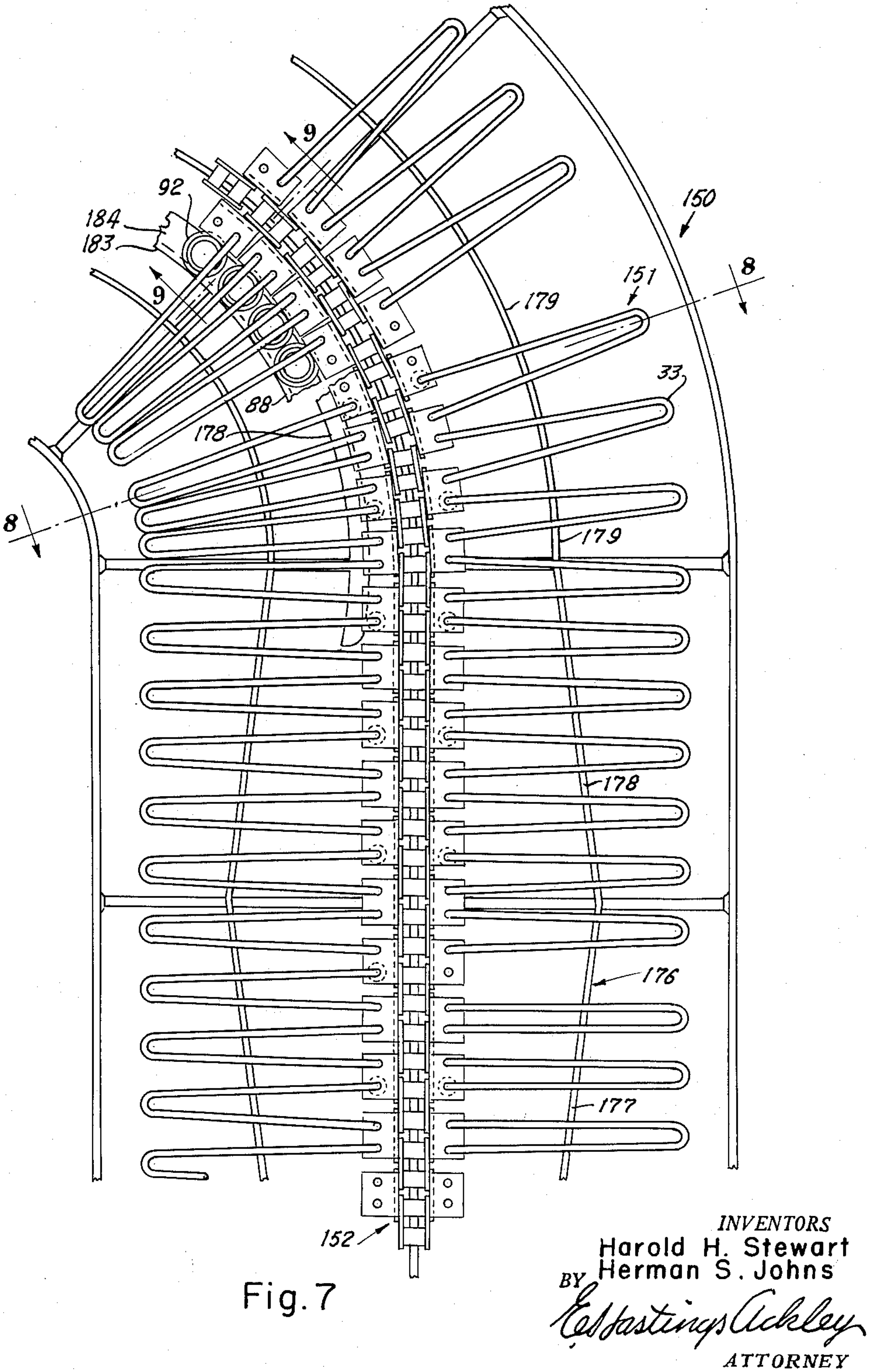
FIGURE 7 is a fragmentary plan view of still another form of the conveyor system of the invention.
Figure 8:
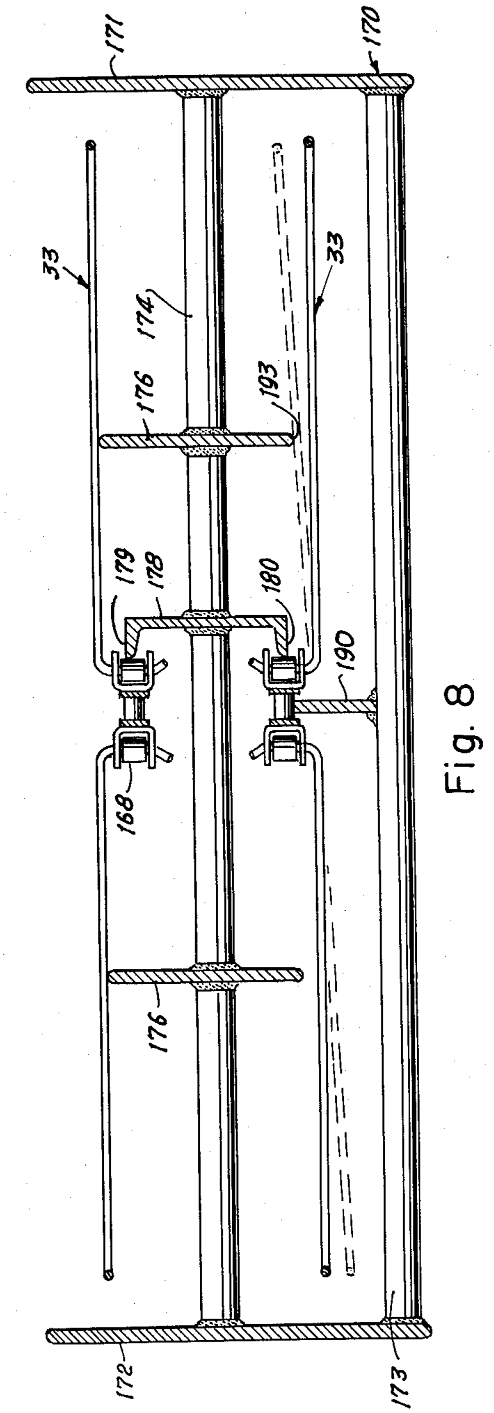
FIGURE 8 is an enlarged sectional view taken on line 8—8 of FIGURE 7.
Figure 9:
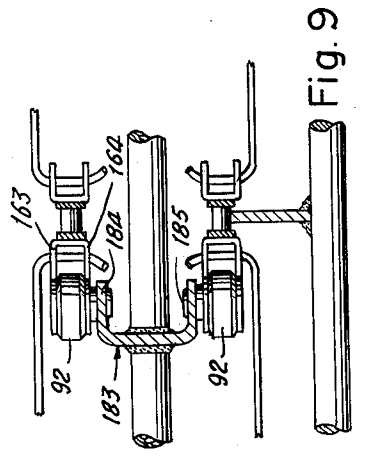
FIGURE 9 is a sectional view taken on line 9—9 of FIGURE 7.
Figure 10:
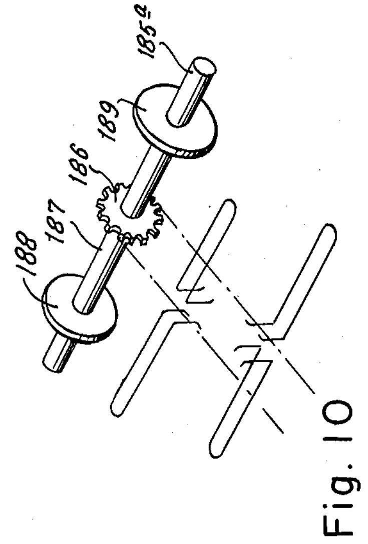
FIGURE 10 is a perspective view showing a sprocket means for changing the direction and vertical plane of movement of the conveyor shown in FIGURE 7.

In FIGURE 23 is illustrated another drive means for such draw members as those illustrated in FIGURES 1 and 7. The drive means includes a pair of sprocket gears 260 and 261 provided with teeth 262 and 263, respectively, which are aligned with respect to each other so that each pair of aligned teeth 262 and 263 enters between the dependent legs 74 and 73 of adjacent support members 33 on opposite sides of the draw member 32. Thus the sprocket teeth 262 and 263 engage the dependent legs 73 and 74 of the support members to drive the draw member in either direction. It will be apparent that one sprocket wheel will act as a backup means for the other sprocket wheel. It will be apparent that the various draw members may be driven by sprocket wheels of the types illustrated by the sprocket wheels 240 and 262 as required.

It will now be apparent that various forms of conveyor systems have been illustrated and described each of which includes a conveyor having an articulated draw member to which are connected resilient support members which extended laterally outwardly from the draw member in opposite directions on each side thereof and that the conveyor is supported on rest bars on which the support members are slidable. It will further be seen that the support members are adapted to support loaves of bread and the like since the support members are in the form of thin widely spaced rods so that they contact small portions of the under surface of each loaf of bread whereby the cooling of the bread may take place uniformly from substantially all surfaces of the bread.

It will further be seen that the support members are substantially V or U-shaped having horizontal legs which diverge toward the draw member from a connecting bight portion and are provided at their free ends with dependent vertical legs which are receivable in suitable apertures of the draw member for connection thereto.

It will further be seen that the support members are resilient and connected to adjacent links of the draw member to permit relative movement between adjacent articulated links of the draw member whereby the conveyor may be caused to move in curvilinear paths so that the direction of movement of the conveyor may be changed at different points to permit both horizontal and vertical changes in the path of movement of the conveyor.

It will further be seen that, as shown in FIGURE 11, each link, such as the links 33e, may be connected to only one link or carrier bracket of the draw member, the legs 73 and 74 extending through the bores 165 and 166 of one carrier bracket and the leg 73 having the bearing 67 rotatably mounted thereon.

It will be further seen that the draw member may be formed of overlapping links which are pivotally or articulately connected at overlapped portions by means of pins or by means of the dependent legs of the support members themselves.

It will be further seen that the conveyor systems illustrated and described include drive means for engaging and moving the draw members of the conveyors and that a guide means, such as the channel guide 81 and the roller guide 83 illustrated in FIGURE 1, are provided at the positions of the path of movement of the conveyor which are curvilinear.

It will further be seen that where it is desired for the conveyor to move in more than one plane, the draw member is doubly articulated being formed of central links to which are pivotally connected carrier brackets for movement about the horizontal axes, the pivotal connecting means between the central links and the carrier brackets permitting limited pivotal movement of the carrier brackets about vertical axes relative to the central links due to the loose fit of the central links or link assemblies 153 and the carrier brackets on the barreled pins 156.

Figures 24, 26:
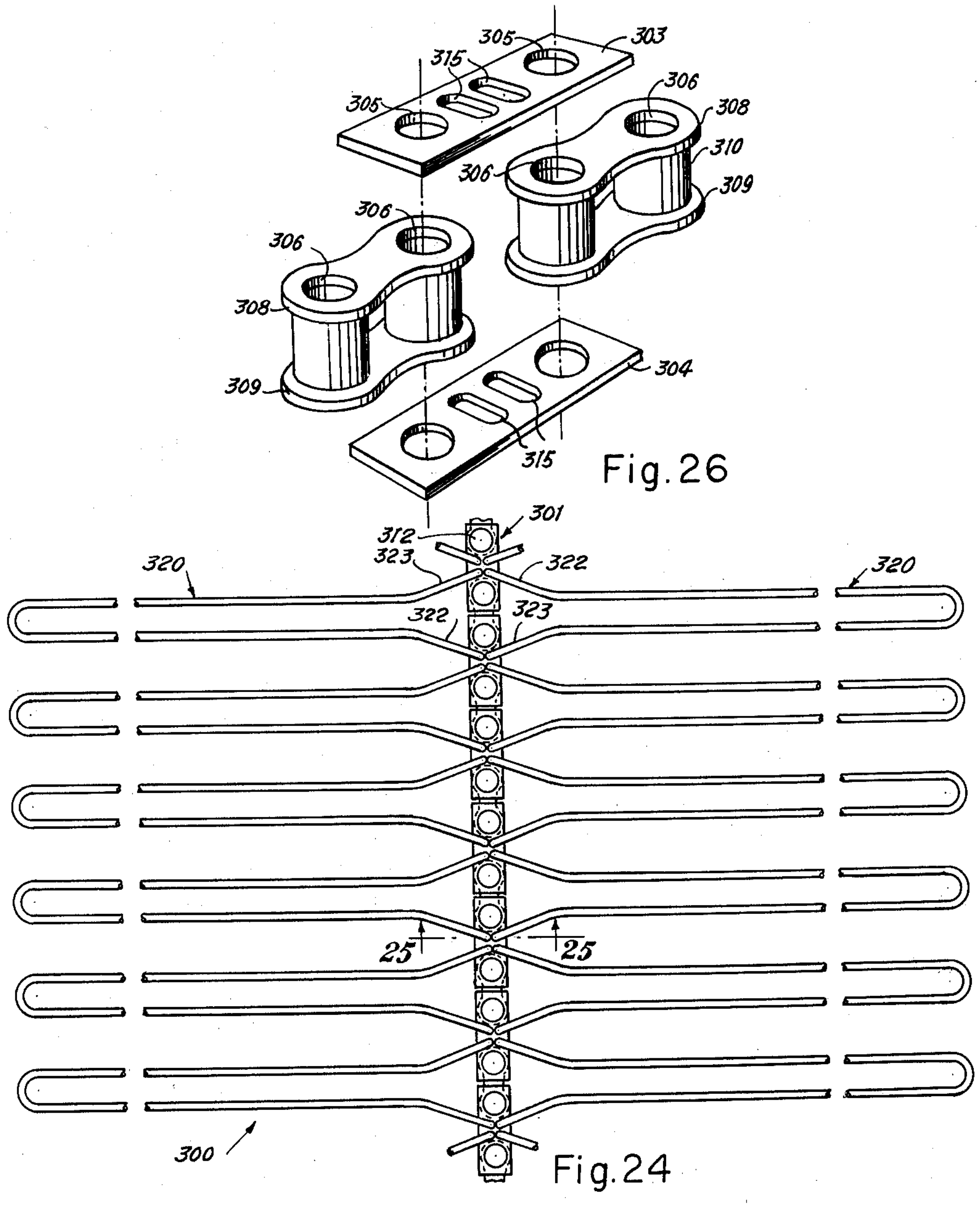
FIGURE 24 is a top fragmentary view of another modified form of the conveyor.
FIGURE 26 is an exploded view of the link assembly employed with the conveyor illustrated in FIGURE 24.
Figure 25:
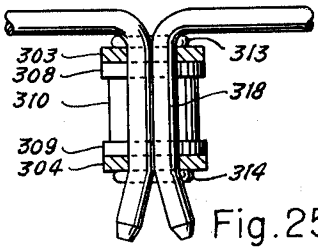
FIGURE 25 is a section view taken on line 25—25 of FIGURE 24.
Figure 27:
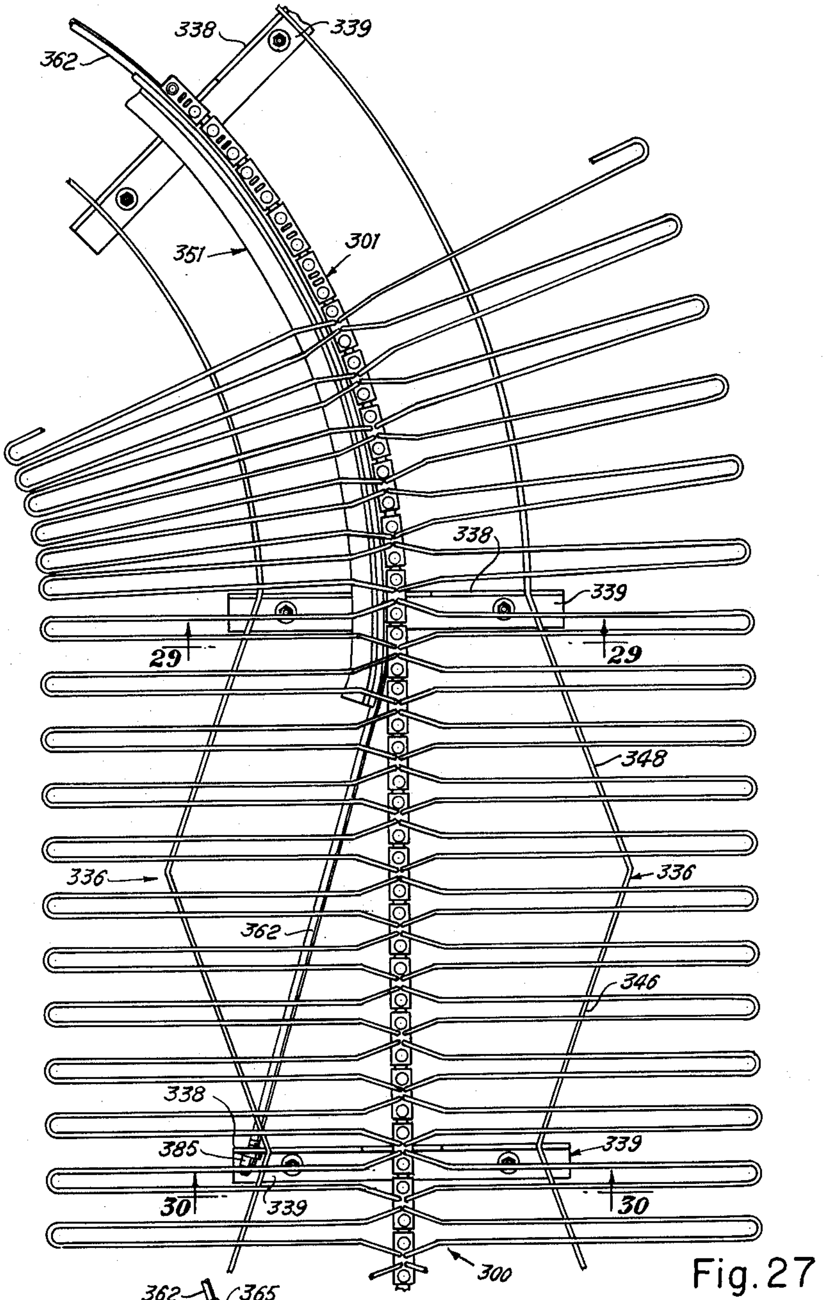
FIGURE 27 is a fragmentary plan view of another form of the conveyor system of the invention.
Figure 28:
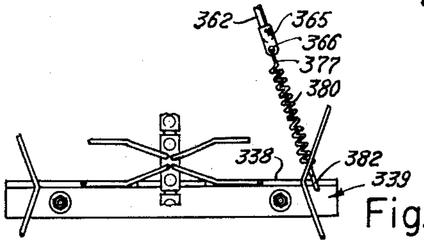
FIGURE 28 is a fragmentary top view of a portion of the conveyor systems illustrated in FIGURE 27 showing the manner in which a friction reducing rod is resiliently tensioned.
Figure 29:
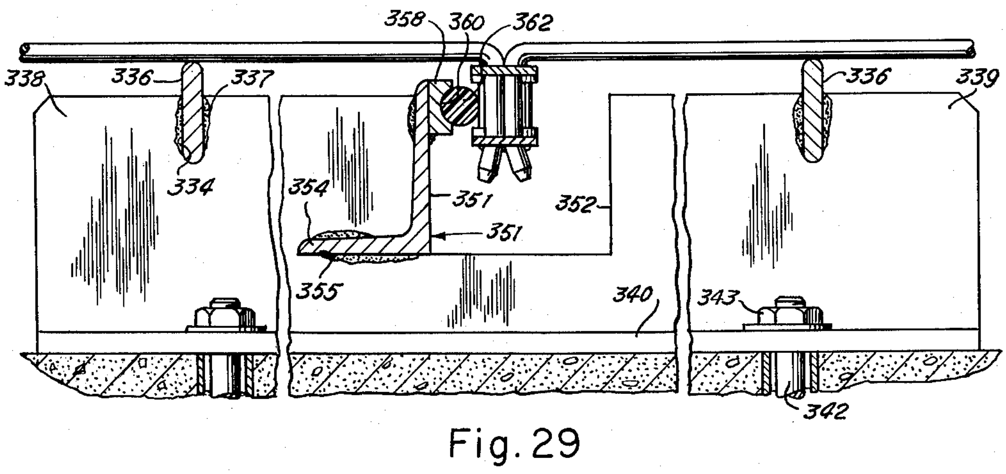
FIGURE 29 is a sectional view taken on line 29—29 of FIGURE 27.
Figure 30:
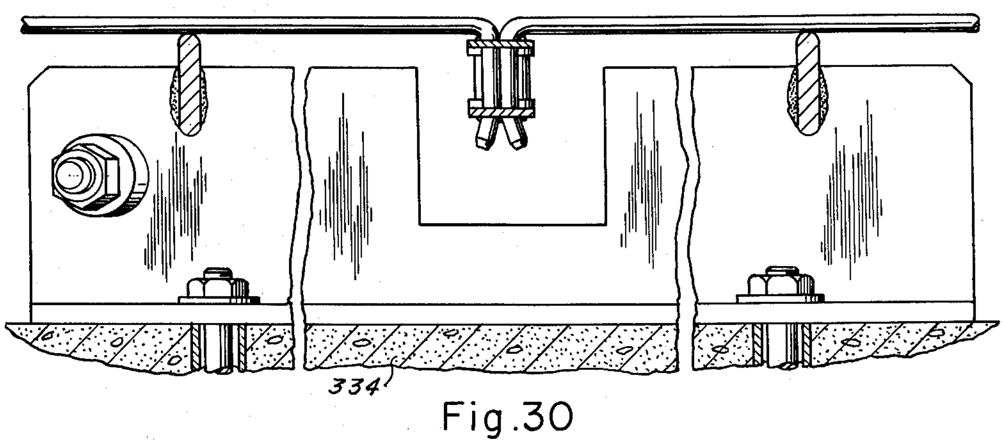
FIGURE 30 is a sectional view taken on line 30—30 of FIGURE 27.

Referring now particularly to FIGURES 24, 25 and 26, the conveyor 300 there illustrated includes a draw member 301 whose outer links 303 and 304 are provided with round apertures 305 which are adapted to be aligned with the round apertures 306 of the inner links 308 and 309. The inner links are separated by spacer rollers 310. Link pins 312 extend through the apertures 305 and 306 and through the spacer rollers 310 to connect the outer links to the inner links. The pins 312 may be upset to form external flanges 313 and 314 on the outer sides of the outer links 303 and 304 whereby the pins are held against displacement in connecting position. The outer links are provided with pairs of transverse elongate slots 315 which are located between adjacent pairs of inner links 308 and 309 whereby the dependent legs 318 of the support members 320 may extend therethrough to be supported by the draw member.

The support members 320 are substantially U-shaped and have outer end portions 322 and 323 which diverge in a horioznta1 plane and terminate in the dependent legs 318. As is easily seen in FIGURES 24 and 25, the dependent leg 318 of the divergent portion 322 of a support member on one side of the draw bar and the dependent leg 318 of the divergent outer portion 323 of a support member 320 disposed on the opposite side of the draw member extend through and are received in the same slots 315 of the outer links 303 and 304. The outer portions 323 and 322 of each support member 320 diverge outwardly so that the ends of each support member 320 may be supported by adjacent pairs of outer links.

In FIGURES 27, 28, 29 and 30 is illustrated another form of the conveyor system employing the conveyor 300. The conveyor 300 is supported on a fixed structure, such as a concrete slab 334, by means of side bars 336 disposed on opposite sides of the draw member 301. The side bars are rigidly secured, as by welds 337, to the vertical flanges 338 of the angle mounts 339. The horizontal flanges 340 of the mounts are secured to the supporting structure 334 by bolts 342 which project through appropriate bores in the horizontal flanges and which are provided with nuts 343 on their threaded upper ends.

The side bars 336 extend through suitable vertical upwardly opening slots 344 in the vertical flanges 338 of the support mounts and are preferably disposed at an angle to the direction of movement of the conveyor in order to spread the wear on the support members 320 over large areas thereof and also to minimize or eliminate squeaking which would otherwise occur due to the generation of heat at a single point of contact. For example, each bar 336 may have two sections 346 and 348 which extend laterally outwardly and convergently from adjacent support mounts 339.

The conveyor system is provided with an arcuate guide member 351 wherever the conveyor 300 begins change of direction. The arcuate guide member 351 is disposed in the slots 352 of the mounts 339 and is preferably in the form of an angle having a vertical flange 353 welded to one vertical side of the flange 339 defining the upwardly opening slot 352 and having its lower flange 354 received in a horizontal slot 355 of the vertical flange 339. The vertical and horizontal flanges 353 and 354, respectively, of the arcuate guide member 351 may be secured to the vertical flanges 339 of the mounts by welds or in other suitable manner. The arcuate guide member 351 is provided at its upper outer end with a guide bar 358 which may be rigidly secured thereto by any suitable means, as by welds. The guide bar 358 is provided with an arcuate recess 360 in which is received a friction reducing rod 362.

The friction reducing rod 362 may be of a hard nylon or other suitable friction reducing substance. One end of the rod 362 is provided with a suitable fitting 365 which is provided with an aperture 366 to receive the hooked end 377 of a tension spring 380. The other hooked end 382 of the spring may be received in a suitable aperture provided in the vertical flange 338 of a suitably located mount 339. The other end of the friction reducing rod 362 may be threaded and extend through a suitable aperture in the vertical flange 338 of another mount 339. The tension on the bar 336 may be adjusted by means of a nut 385 on the threaded outer end of the bar. A suitable washer 386 may be interposed between the innermost nut 365 and the flange 338.

It will now be seen that the conveyor system illustrated in FIGURES 27, 28, 29 and 30 is provided with a friction reducing guide means which includes the arcuate guide member 351 and the friction reducing rod 362. It will further be seen that the friction reducing guide 362 may be held under appropriate tension by means of the spring 380 and the nuts 385.

Figure 31:
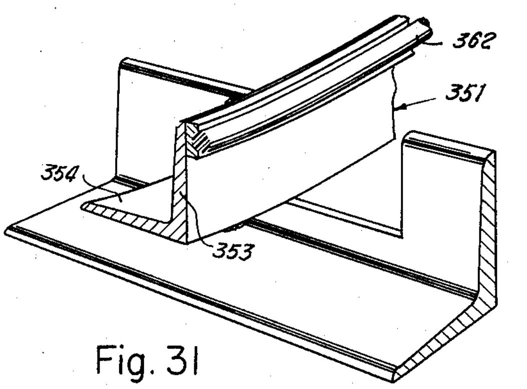
FIGURE 31 is a fragmentary perspective view of the guide member employed in the conveyor system illustrated in FIGURE 27.
Figures 32, 33, 34:
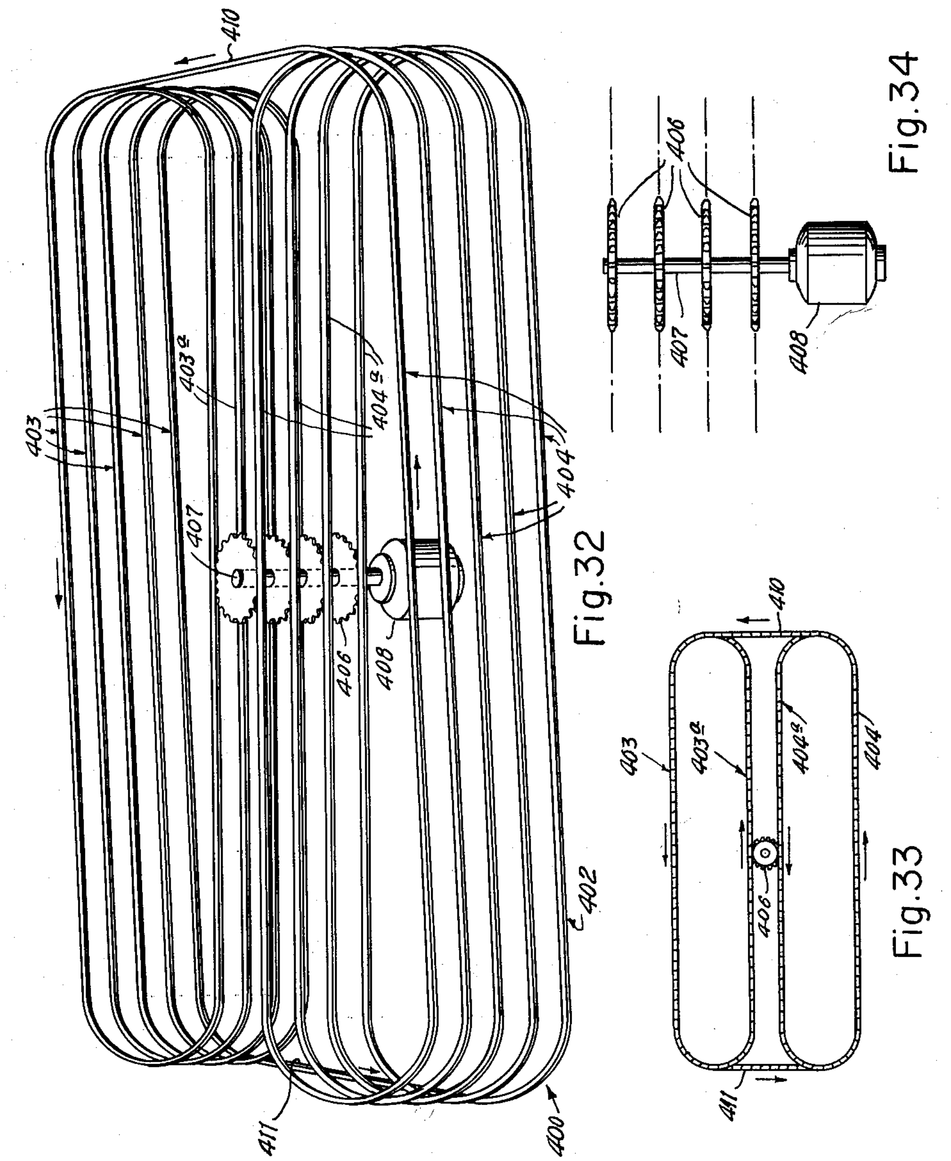
FIGURE 32 is a perspective view showing a conveyor system wherein the conveyor includes two sets of vertically spaced loops which are driven simultaneously by sprockets, each sprocket engaging adjacent parallel loop portions of the conveyor.
FIGURE 33 is a top plan view of the conveyor illustrated in FIGURE 32.
FIGURE 34 is a vertical view of the drive means of the conveyor system illustrated in FIGURE 32.

In FIGURES 31, 32 and 33 is illustrated schematically a drive means for a conveyor system having a conveyor which has a pair of vertically spaced sets of loops. The conveyor system 400 includes a draw member 402 which has two sets of vertically spaced loops 403 and 404. The loops 403 and 404 have parallel adjacent sections 403a and 404a so that the sprockets 406 on the drive shaft 407 of a prime mover 408, such as an electric motor, may simultaneously engage horizontally and vertically aligned pairs of loop sections 403a and 404a, so that all loops of the conveyor are driven simultaneously. The conveyor of course is of the endless type so that the uppermost loop 404 is connected by the conveyor section 410 to the uppermost loop 403 and in a similar way, the lowermost loop 403 is connected by a section 411 of the conveyor to the lowermost loop 404. It will be understood of course that all sections of the conveyor move simultaneously and that suitable guides are provided at every point where the conveyor loops change direction either vertically or horizontally as was more fully explained above. The provision of a drive means which includes a plurality of sprockets mounted on the same drive shaft and each of which simultaneously engages the draw member of adjacent loops of the conveyors insures that there is no backlash in the conveyor and that all portions and sections of the conveyor move smoothly and continuously without undue jolting or vibration.

The foregoing description of the invention is explanatory only, and changes in the details of the construction illustrated may be made by those skilled in the art, within the scope of the appended claims, without departing from the spirit of the invention.

We claim:

1. A conveyor system comprising: a conveyor having a draw member, said draw member having a plurality of sections pivotally connected together for movement with respect to each other about vertical axes; a plurality of support members connected to said sections and extending laterally outwardly therefrom in opposite directions; and support means for said conveyor, said conveyor being slidable on said support means, said support means comprising means disposed on opposite sides of said draw member providing upwardly facing slide surfaces upon which said support members are slidably disposed, some portions at least of said slide surfaces extending angularly with repect to the path of movement of said draw member whereby said slide surfaces engage different portions of said support members as said conveyor moves in its path whereby the wear on the support members is distributed over large surfaces thereof.

2. A conveyor comprising: a draw member having a plurality of sections articulately connected to one another for pivotal movement relative to one another about vertical axes, said sections being provided with vertical bores; and support members connected to said sections, said support members having horizontal legs for supporting articles to be carried by the conveyor, said horizontal legs extending convergently outwardly from said sections toward a connecting bight portion and having dependent vertical legs receivable in said bores.

3. A conveyor comprising: a draw member, said draw member having a plurality of pairs of inner links and outer links, the links of each pair of outer links overlapping adjacent ends of the links of adjacent pairs of inner links; means pivotally connecting the overlapped portions of said pairs of inner and outer links, said outer links being provided with vertically aligned apertures; and support members extending horizontally and laterally outwardly from said links and having dependent legs receivable in said vertically aligned apertures of said outer links.

4. A conveyor comprising: a draw member, said draw member having a plurality of pairs of inner links and outer links, the links of each pair of outer links overlapping adjacent ends of the links of adjacent pairs of inner links; means pivotally connecting the overlapped portions of said pairs of inner and outer links, said outer links being provided with vertically aligned apertures; and support members extending horizontally and laterally outwardly from said links and having dependent legs receivable in said vertically aligned apertures of said outer links, said support members being resilient.

5. A conveyor comprising: a draw member, said draw member having a plurality of pairs of inner links and outer links, the link of each pair of said outer links overlapping end portions of the links of adjacent pairs of inner links, means pivotally connecting overlapped portions of said pairs of inner and outer links, said outer links being provided with vertically aligned apertures; and support members extending horizontally and laterally outwardly from said links and having dependent legs receivable in said vertically aligned apertures of said outer links, said support members being resilient and having horizontal legs extending divergently from connecting bight portions toward said draw member.

6. A conveyor comprising: a draw member, said draw member having a plurality of pairs of inner links and outer links, the link of each pair of said outer links overlapping end portions of the links of adjacent pairs of inner links, means pivotally connecting overlapped portions of said pairs of inner and outer links, said outer links being provided with vertically aligned apertures; and support members extending horizontally and laterally outwardly from said links and having dependent legs receivable in said vertically aligned apertures of said outer links, said carrier members being resilient and having horizontal legs extending divergently from connecting bight portions toward said draw member, said legs of each of said support members being received in aligned apertures of adjacent pairs of links whereby the support members resiliently connect adjacent pairs of links.

7. A conveyor comprising: a draw member, said draw member having a plurality of pairs of inner links and outer links, the link of each pair of said outer links overlapping end portions of the links of adjaent pairs of inner links, means pivotally connecting overlapped portions of said pairs of inner and outer links, said outer links being provided with vertically aligned apertures; and support members extending horizontally and laterally outwardly from said links and having dependent legs receivable in said vertically aligned apertures of said outer links, said carrier members being resilient and having horizontal legs extending divergently from connecting bight portions toward said draw member, said support members having retainer portions extending angularly from the ends of said dependent legs.

8. A conveyor comprising: a draw member, said draw member having a plurality of pairs of inner links and outer links, the link of each pair of said outer links overlapping end portions of the links of adjacent pairs of inner links, means pivotally connecting overlapped portions of said pairs of inner and outer links, said outer links being provided with vertically aligned apertures; and support members extending horizontally and laterally outwardly from said links and having dependent legs receivable in said vertically aligned apertures of said outer links, said support members being resilient and having horizontal legs extending divergently from connecting bight portions toward said draw member, said support members having retainer portions extending angularly from the ends of said dependent legs, said retainer portions having beveled shoulders at their ends to facilitate assembly of the carrier members on said links.

9. A conveyor comprising: a draw member, said draw member comprising a plurality of central sections, carrier brackets overlapping and disposed on opposite sides of adjacent pairs of said central sections, and means connecting said carrier brackets and said central sections to provide for pivotal movement of adjacent central sections about horizontal axes, said last mentioned means permitting pivotal movement of said central sections relative to said carrier brackets about vertical axes; and support members connected to said carrier brackets and extending horizontally outwardly from said carrier brackets.

10. A conveyor system including: a conveyor having a doubly articulated draw member which is movable in curvilinear paths in more than one plane, and a plurality of support members extending laterally outwardly from both sides of said draw member; and a supporting structure for said conveyor comprising a frame having rest bars upon whose upper surfaces said carrier members are slidable, rotatable means for guiding movement of said draw member in a vertical plane, and a support member disposed below said upper surfaces of said rest bars for engaging said draw member.

11. A conveyor system comprising: a conveyor having a doubly articulated draw member movable in vertically spaced planes, and a plurality of support members extending laterally outwardly from said draw member; and a supporting structure for said conveyor including a pair of rest bars having upper surfaces upon which said support members are slidably disposed, a guide means rotatably mounted on said structure engageable with said draw member for guiding movement of said guide member between said planes, and a support member engageable with said draw member for supporting portions of said draw member in said lower plane.

12. A conveyor system comprising: a conveyor having a doubly articulated draw member movable in vertically spaced planes, and a plurality of support members extending laterally outwardly from said draw member; and a supporting structure for said conveyor including a pair of rest bars having upper surfaces upon which said support members are slidably disposed, a guide means rotatably mounted on said structure engageable with said draw member for guiding movement of said guide member between said planes, and a support member engageable with said draw member for supporting portions of said draw member in said lower plane, said rest bars having lower surfaces engageable with said support members to limit angular movement of said conveyor with respect to said support member.

13. A conveyor system comprising: a conveyor having a doubly articulated draw member movable in vertically spaced planes, and a plurality of support members extending laterally outwardly from said draw member; and a supporting structure for said conveyor including a pair of rest bars having upper surfaces upon which said support members are slidably disposed, a guide means rotatably mounted on said structure engageable with said draw member for guiding movement of said guide member between said planes, and a support member engageable with said draw member for supporting portions of said draw member in said lower plane, said guide member comprising an arcuate support member having a plurality of rollers rotatably mounted thereon and engageable by said draw member.

14. A conveyor comprising: a draw member, said draw member including a plurality of vertically aligned pairs of carrier plates, each of said pairs of carrier plates having a pair of vertically aligned bores adjacent opposite ends thereof; links extending between adjacent pairs of carrier plates having bores aligned with said bores of said carrier plates and pivotally connected thereto by pins extending through said bores, said carrier plates being provided with vertically aligned pairs of bores adjacent the sides thereof, and support members extending laterally outwardly from said carrier plates and having dependent legs disposed in said vertically aligned pairs of bores adjacent the sides of the carrier plates.

15. A conveyor including: a plurality of pairs of carrier plates, means holding the plates of each pair of plates in vertically spaced positions, said means comprising a pair of spaced sleeves extending through vertically aligned apertures in each pair of plates and rollers disposed about said sleeves and between the plates of each pair of plates; links, said links and said carrier plates of adjacent pairs of carrier plates having overlapping portions pivotally connected together by pins extending through said sleeves, said carrier plates being provided with vertically aligned apertures adjacent the side edges thereof; and support members extending laterally outwardly from said carrier plates and having dependent legs received in said pairs of bores adjacent the sides of the carrier plates.

16. A conveyor comprising: a pair of inner plates, said inner plates having a pair of vertically aligned apertures adjacent opposite ends thereof; means connecting said inner plates including spaced sleeves extending into said apertures and rollers disposed between said inner plates; a plurality of pairs of carrier plates pivotally connected to said inner plates by pins extending through said sleeves, said carrier plates having vertically aligned pairs of apertures adjacent the sides thereof; and carrier members extending laterally outwardly from said carrier plates and having dependent legs received in said vertically aligned pairs of apertures in said carrier plates.

17. A conveyor comprising: a plurality of pairs of outer links, said outer links having aligned pairs of apertures adjacent opposite ends thereof; intermediate links interposed between adjacent pairs of outer links and provided with apertures registering with the apertures of said outer links; and support members extending laterally outwardly from said draw member and having dependent legs extending through said registering apertures in said outer and inner links to articulately connect said outer links to said intermediate links.

18. A conveyor comprising: a draw member having a plurality of sections articulately connected to one another, said sections being provided with vertical bores; and support members connected to said sections, said support members having horizontal legs extending convergently outwardly from said sections toward a connecting bight portion and having dependent legs receivable in said bores, the dependent legs of each of said support members being received in the bores of adjacent sections whereby the support members resiliently connect adjacent sections of the draw member.

19. A conveyor system comprising: a conveyor having a draw member, said draw member having a plurality of sections pivotally connected together for movement with respect to each other about vertical axes; a plurality of support members connected to said sections and extending laterally outwardly therefrom in opposite directions; support means for said conveyor, said conveyor being slidable on said support means; and guide means engaging the said draw member at points of change of direction of movement of said conveyor, said guide means comprising a friction reducing rod engageable with said draw member.

20. A conveyor system comprising: a conveyor having a draw member, said draw member having a plurality of sections pivotally connected together for movement with respect to each other about vertical axes; a plurality of support members connected to said sections and extending laterally outwardly therefrom in opposite directions; support means for said conveyor, said conveyor being slidable on said support means; and guide means engaging the said draw member at points of change of direction of movement of said conveyor, and guide means engageable with said draw member for guiding movement of said draw member along curvilinear portions of the path of movement of said draw member, said guide means including a friction reducing member engaging said draw member, and means for holding said friction reducing member under tension.

21. A conveyor comprising: a draw member, said draw member having a plurality of pairs of inner links and outer links, the links of each pair of outer links overlapping the adjacent ends of the links of adjacent pairs of inner links; means pivotally connecting the overlapped portions of said pairs of inner and outer links, said outer links being provided with vertically aligned transverse slots located between the ends of adjacent inner links connected to said outer links; and support members extending horizontally and laterally from said links and having dependent legs receivable in said slots of said outer links.

22. A conveyor comprising: a draw member, said draw member having a plurality of pairs of inner links and outer links, the links of each pair of outer links overlapping the adjacent ends of the links of adjacent pairs of inner links; means pivotally connecting the overlapped portions of said pairs of inner and outer links, said outer links being provided with vertically aligned transverse slots located between the ends of adjacent inner links connected to said outer links; and support members extending horizontally and laterally from said links and having dependent legs receivable in said slots of said outer links, said support members being substantially U-shaped and having divergent portions provided with said dependent legs whereby each support member has its dependent legs received in the slots of adjacent pairs of outer links.

23. A conveyor comprising: a draw member having a plurality of sections articulately connected to one another for pivotal movement relative to one another about vertical axes, said sections being provided with vertical bores; and support members connected to said sections, said support members having horizontal legs for supporting articles to be carried by the conveyor, said horizontal legs extending convergently outwardly from said sections toward a connecting bight portion and having dependent legs receivable in said bores, said draw member having a plurality of loops arranged in two sets of aligned vertically spaced loops, each pair of vertically aligned loops having adjacent sections moving in opposite directions, and drive means extending between said sets of loops and engaging said adjacent sections of said loops for simultaneously driving all loops of said draw member.

References Cited in the file of this patent

UNITED STATES PATENTS

| | | |
|---|---|---|
| Re. 20,269 | Green | Feb. 16, 1937 |
| 1,837,502 | Thompson | Dec. 22, 1931 |
| 1,948,090 | Alvey | Feb. 20, 1934 |
| 2,374,267 | Berg et al. | Apr. 24, 1945 |
| 2,515,079 | Dalrymple | July 11, 1950 |
| 2,664,188 | Rhodes | Dec. 29, 1953 |
| 2,870,902 | Rada et al. | Jan. 27, 1959 |

FOREIGN PATENTS

| | | |
|---|---|---|
| 1,155,030 | France | Nov. 18, 1957 |